United States Patent
Zou et al.

(10) Patent No.: US 11,120,752 B2
(45) Date of Patent: Sep. 14, 2021

(54) DISPLAY PANEL, DRIVING METHOD THEREOF AND DISPLAY DEVICE

(71) Applicant: BOE TECHNOLOGY GROUP CO., LTD., Beijing (CN)

(72) Inventors: Xiangxiang Zou, Beijing (CN); Kuanjun Peng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/815,753

(22) Filed: Nov. 17, 2017

(65) Prior Publication Data
US 2018/0315378 A1 Nov. 1, 2018

(30) Foreign Application Priority Data
Apr. 26, 2017 (CN) .......................... 201710283573.3

(51) Int. Cl.
*G09G 3/34* (2006.01)
*G02B 26/04* (2006.01)
(Continued)

(52) U.S. Cl.
CPC ............. *G09G 3/346* (2013.01); *G02B 5/003* (2013.01); *G02B 5/3083* (2013.01); *G02B 26/04* (2013.01);
(Continued)

(58) Field of Classification Search
None
See application file for complete search history.

(56) References Cited

U.S. PATENT DOCUMENTS

| 2011/0235147 A1* | 9/2011 | Lee | ........................ | G02B 26/02 359/230 |
| 2014/0184573 A1* | 7/2014 | Nemchuk | .............. | G02B 26/02 345/204 |

(Continued)

FOREIGN PATENT DOCUMENTS

| CN | 104360559 A | 2/2015 |
| CN | 104865750 A | 8/2015 |

(Continued)

OTHER PUBLICATIONS

First Office Action for Chinese Patent Application No. 201710283573.3 dated Sep. 21, 2018.

*Primary Examiner* — Stephen T. Reed
(74) *Attorney, Agent, or Firm* — Calfee, Halter & Griswold LLP

(57) ABSTRACT

The present disclosure provides a display panel, a driving method thereof, and a display device. The display panel includes: a first substrate; a second substrate, a light absorbing layer disposed on a surface of the first substrate facing the second substrate, a color film disposed on a surface of the second substrate facing the first substrate, a plurality of MEMS light valve units disposed between the light absorbing layer and the color film. The MEMS light valve unit includes a light shielding plate and a light reflecting layer disposed on a surface of the light shielding plate facing the color film. The plurality of MEMS light valve units is respectively located in a plurality of sub-pixel regions of the display panel, and an area of the light absorbing layer is smaller than an area of the color film in any one of the sub-pixel regions.

13 Claims, 4 Drawing Sheets

(51) Int. Cl.
 *G02B 5/30* (2006.01)
 *G02B 5/00* (2006.01)
(52) U.S. Cl.
 CPC .............. *G09G 2300/0465* (2013.01); *G09G 2320/0646* (2013.01)

(56) References Cited

U.S. PATENT DOCUMENTS

| | | | | |
|---|---|---|---|---|
| 2016/0018635 A1* | 1/2016 | Adachi | .................. | G02B 26/02 359/228 |
| 2017/0242302 A1* | 8/2017 | Asakawa | .......... | G02F 1/133504 |
| 2017/0365461 A1* | 12/2017 | Iwaki | .................. | H01L 21/0271 |
| 2018/0151630 A1* | 5/2018 | Yamaoka | .............. | H01L 51/504 |

FOREIGN PATENT DOCUMENTS

| CN | 105487287 A | 4/2016 |
|---|---|---|
| JP | 2017015766 A | 1/2017 |
| TW | 201432305 A | 8/2014 |

\* cited by examiner

DISPLAY PANEL, DRIVING METHOD THEREOF AND DISPLAY DEVICE

CROSS-REFERENCE TO RELATED APPLICATIONS

The present application is based upon and claims priority to Chinese patent Application No. 201710283573.3, filed on Apr. 26, 2017, and the entire contents thereof are incorporated herein by reference.

TECHNICAL FIELD

The present disclosure relates to the field of display technology, and more particularly, to a display panel and a driving method thereof, and a display device.

BACKGROUND

MEMS (Micro-Electro-Mechanical System) is a high-tech device based on microelectronics, micro-machine and materials science, having a size of a few millimeters or less and generally an internal structure of the order of microns or even nanometers, which is an independent intelligent system. With the rapid development of MEMS technology, displays based on the MEMS technology have become an important trend of development in the future. Compared with the traditional liquid crystal display devices, MEMS display devices employ MEMS light valves instead of liquid crystal layers, and may control transmittance of the light through the MEMS light valves.

SUMMARY

Embodiments of the present disclosure provide a display panel and a driving method thereof, and a display device.

In a first aspect, there is provided a display panel, including: a first substrate; a second substrate; a light absorbing layer disposed on a surface of the first substrate facing the second substrate; a color film disposed on a surface of the second substrate facing the first substrate; and a plurality of MEMS light valve units disposed between the light absorbing layer and the color film. The MEMS light valve unit includes a light shielding plate and a light reflecting layer disposed on a surface of the light shielding plate facing the color film. The plurality of MEMS light valve units are respectively located in a plurality of sub-pixel regions of the display panel, and an area of the light absorbing layer is smaller than an area of the color film in any one of the sub-pixel regions.

In an embodiment, the display panel further includes a polarizer disposed on the second substrate. A ¼ phase retardation film is disposed on the polarizer, and a projection of the polarizer and a projection of the absorption layer in a direction perpendicular to the display panel are not overlapped with each other.

In an embodiment, an area of the color film is smaller than or equal to a sum of an area of the light absorbing layer and an area of the polarizer in any one of the sub-pixel regions.

In an embodiment, the display panel further includes a backlight assembly providing a backlight to the display panel.

In an embodiment, the light shielding plate is made of a metal material.

In an embodiment, the light absorption layer is formed of a black matrix material.

In a second aspect, there is provided a driving method of a display panel, for driving the display panel according to any embodiment of the first aspect. The method includes: receiving a display signal; acquiring a grayscale value of a sub-pixel unit based on a frame image corresponding to the display signal; and adjusting an overlapping area of a projection of the light absorbing layer and a projection of the light shielding plate of the MEMS light valve unit in the sub-pixel unit in a direction perpendicular to the display panel, according to the grayscale value of the sub-pixel unit. The grayscale value of the sub-pixel unit has a positive correlation with the overlapping area of the projection of the light absorbing layer and the projection of the light shielding plate of the MEMS light valve unit in the direction perpendicular to the display panel.

In an embodiment, the adjusting an overlapping area of a projection of the light absorbing layer and a projection of the light shielding plate of the MEMS light valve unit in the sub-pixel unit in a direction perpendicular to the display panel, according to the grayscale value of the sub-pixel unit includes: adjusting the light shielding plate of the MEMS light valve unit in the sub-pixel unit such that the projection of the light shielding plate and the projection of the light absorbing layer in the direction perpendicular to the display panel are overlapped with each other entirely, when the grayscale value of the sub-pixel unit is a maximum grayscale value that the sub-pixel unit is capable of displaying.

In an embodiment, the adjusting an overlapping area of a projection of the light absorbing layer and a projection of the light shielding plate of the MEMS light valve unit in the sub-pixel unit in a direction perpendicular to the display panel, according to the grayscale value of the sub-pixel unit includes: adjusting the light shielding plate of the MEMS light valve unit in the sub-pixel unit such that the projection of the light shielding plate and the projection of the light absorbing layer in the direction perpendicular to the display panel are not overlapped with each other, when the grayscale value of the sub-pixel units is a minimum grayscale value that the sub-pixel unit is capable of displaying.

In a third aspect, there is provided a display device, including: the display panel according to any embodiment of the first aspect.

BRIEF DESCRIPTION OF THE DRAWINGS

In order to describe the embodiments of the present disclosure more clearly, the accompanying drawings required for describing the embodiments are briefly introduced in the followings. Apparently, the accompanying drawings in the following description are merely some of the embodiments of the present disclosure. Other drawings may be obtained by those skilled in the art according to these accompanying drawings without paying creative work.

DETAILED DESCRIPTION

The technical solutions in the embodiments of the present disclosure will be described clearly and completely hereinafter with reference to the accompanying drawings in the embodiments of the present disclosure. Apparently, the described embodiments are merely some but not all of the embodiments of the present disclosure. All other embodiments obtained by those skilled in the art based on the embodiments of the present disclosure without creative efforts should fall within the protection scope of the present disclosure.

Figure 1:
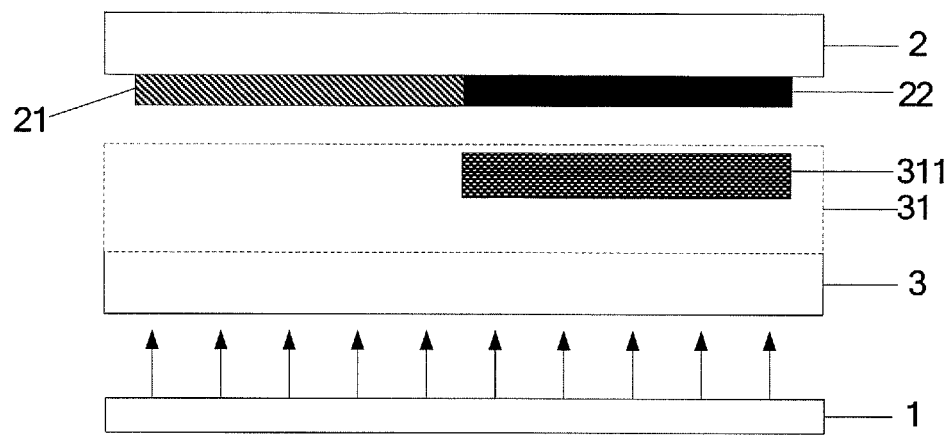
FIG. 1 is a schematic structural diagram of a MEMS display device according to an embodiment of the present disclosure.

FIG. 1 is a cross-sectional view of a MEMS display device according to an embodiment of the present disclosure. Referring to FIG. 1, the MEMS display device includes a light source 1, a color film 21 and a black matrix 22 disposed on a first substrate 2 and a plurality of MEMS light valves 31 disposed on a second substrate 3. The plurality of MEMS light valves 31 are located in a plurality of sub-pixel units respectively. Each of the MEMS light valves 31 includes a light shielding plate 311. A region other than the region where the black matrix 22 and/or the light shielding plate 311 are disposed is a light transmitting region in the sub-pixel unit. While the MEMS display device is performing a display, the size of the light transmitting region of the sub-pixel unit may be adjusted by controlling the movement of the light shielding plate 311, so as to adjust the light transmittance of the sub-pixel unit, and in turn, to make the sub-pixel units of the MEMS display device to display different grayscale values. It may be seen from the above structure of the MEMS display device that, the effective display region in the sub-pixel unit of the MEMS display device is the light transmitting region. However, the area of the light transmitting region of the sub-pixel unit is smaller than 50% of the area of the sub-pixel unit. Therefore, the MEMS display device has a rather low aperture ratio.

Figure 2:
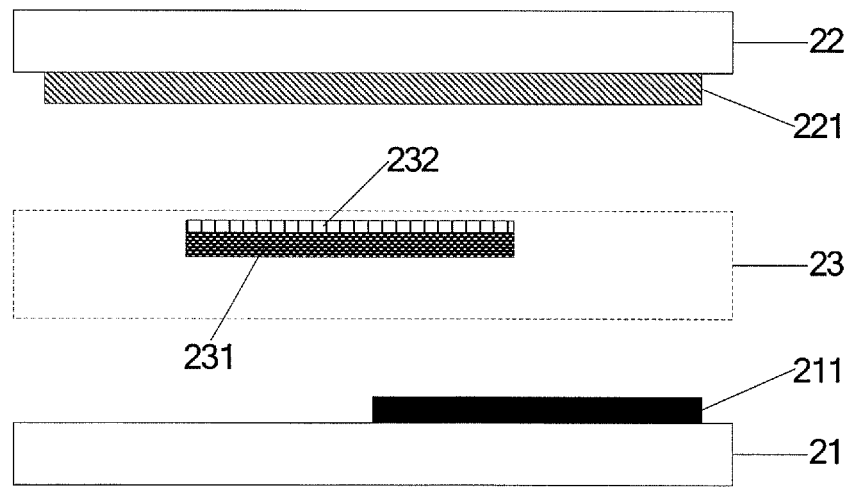
FIG. 2 is a first schematic structural diagram of a display panel according to an embodiment of the present disclosure.

An embodiment of the present disclosure provides a display panel. Referring to FIG. 2, the display panel includes: a first substrate 21, a second substrate 22, a light absorbing layer 211 disposed on a surface of the first substrate 21 facing the second substrate 12, a color film 221 disposed on a surface of the second substrate 22 facing the first substrate 21, a plurality of MEMS light valve units 23 disposed between the light absorbing layer 211 and the color film 221. The MEMS light valve unit 23 includes a light shielding plate 231 and a light reflecting layer 232 disposed on a surface of the light shielding plate 231 facing the color film 221.

The plurality of MEMS light valve units 23 are respectively located in a plurality of sub-pixel regions of the display panel. The area of the light absorbing layer 211 is smaller than the area of the color film 221 in the sub-pixel region.

In an embodiment, the first substrate 21 and the second substrate 22 may be transparent substrates made of glass, ceramic, organic material, or the like.

In an embodiment, the light absorbing layer 211 may be formed of black matrix (BM) material. That is, in the embodiment of the present disclosure, the light absorbing layer 211 may be made of the material for forming the black matrix when the display panel is manufactured. Specifically, the BM material is a material that may be formed by doping a black dye and/or a pigment in a resin. The black dye and/or the pigment may be carbon black, ferrous metal, and the like. In the embodiments of the present disclosure, the specific components of the black matrix material are not limited. The light absorbing layer 211 in the above embodiment may be formed of any existing black matrix material.

In an embodiment, the light shielding plate 231 may be formed of metal material, such as copper, iron, aluminum, tin and so on.

Figure 3:
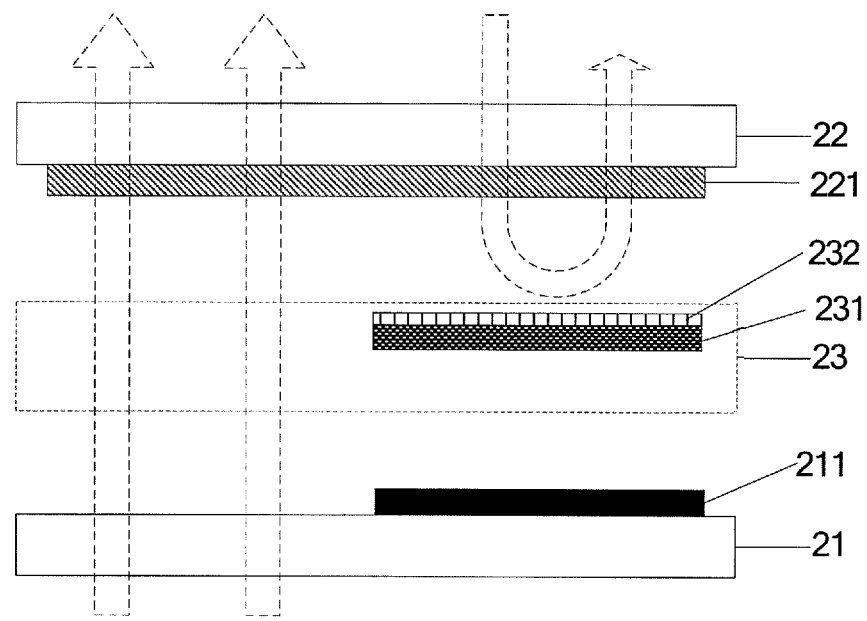
FIG. 3 is a first schematic diagram of the working principle of a display panel according to an embodiment of the present disclosure.
Figure 4:
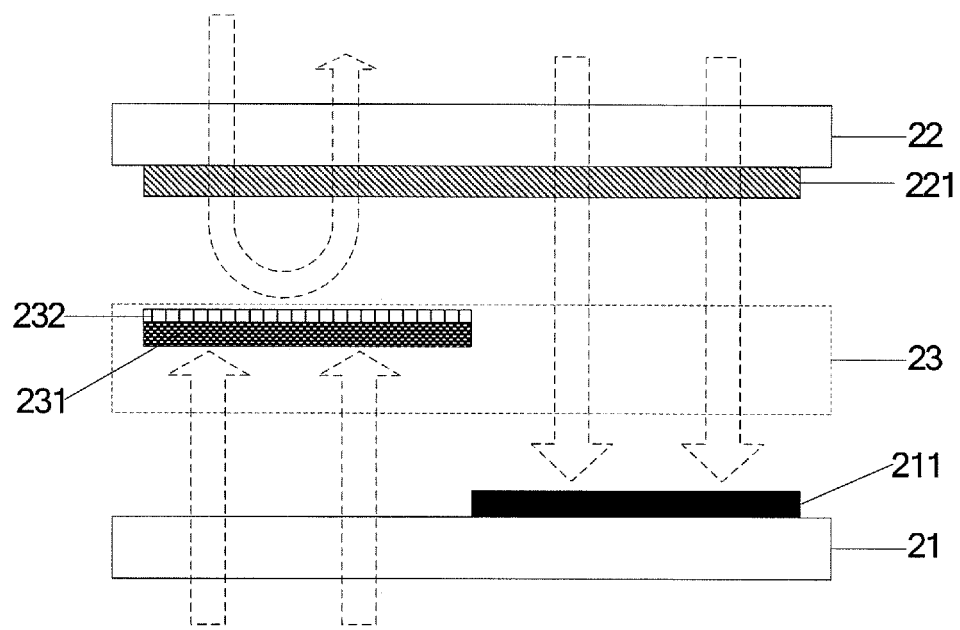
FIG. 4 is a second schematic diagram of the working principle of a display panel according to an embodiment of the present disclosure.
Figure 5:
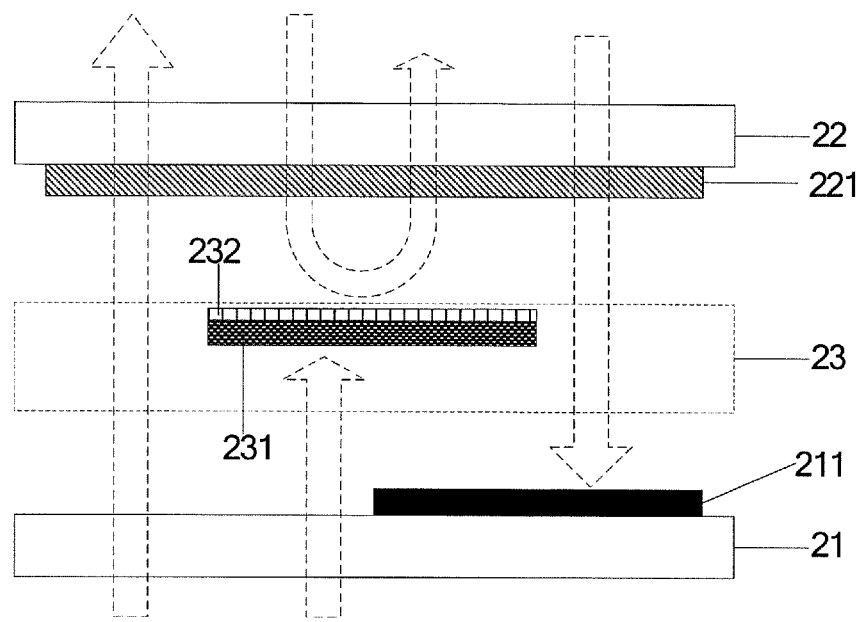
FIG. 5 is a third schematic diagram of the working principle of a display panel according to an embodiment of the present disclosure.

The operation principle of the display panel shown in FIG. 2 will be described below with reference to FIGS. 3, 4 and 5. FIG. 3 is a cross-sectional view of the sub-pixel unit in the display panel when the grayscale value displayed by the sub-pixel unit is the maximum grayscale value (typically 255) that the sub-pixel unit may display. FIG. 4 is a cross-sectional view of the sub-pixel unit in the display panel when the grayscale value displayed by the sub-pixel unit is the minimum grayscale value (typically 0) that the sub-pixel unit may display. FIG. 5 is a cross-sectional view of the sub-pixel unit in the display panel when the grayscale value displayed by the sub-pixel unit is a grayscale value between the maximum grayscale value and the maximum grayscale value that the sub-pixel unit may display.

Referring to FIG. 3, when the grayscale value displayed by the sub-pixel unit is the maximum grayscale value that the sub-pixel unit may display, a projection of the light shielding plate 231 of the MEMS light valve unit 23 and a projection of the light absorbing layer 211 in a direction perpendicular to the display panel are overlapped with each other entirely. Therefore, at this time, the area of the light transmitting region in the sub-pixel unit has the maximum value. Further, when the grayscale value of the sub-pixel unit is the maximum grayscale value that the sub-pixel unit may display, the propagation of the light rays (the light rays are represented by dotted lines with arrows in the figure) in the display panel is as follows. In the first aspect, in the light transmitting region, the light ray entering the display panel through the first substrate 21 passes through the first substrate 21, the color film 221 and the second substrate 22 successively, and then exits the display panel. In the second aspect, in the region where the light shielding plate 231 is located, the light ray entering the display panel through the second substrate 22 passes through the second substrate 22 and the color film 221 and reaches the light shielding plate 231. Since the light shielding plate 231 is provided with the light reflecting layer 232 on the surface thereof facing the color film 221, the light ray is reflected and exits the display panel through the color film 221 and the second substrate 22 successively. As may be seen from FIG. 3, when the grayscale value of the sub-pixel unit is the maximum grayscale value that the sub-pixel unit may display, the brightness of the sub-pixel unit is the sum of the brightness of the light ray emitted from the display panel in the first aspect and the brightness of the light ray emitted from the display panel in the second aspect, and the area of the light transmitting region reaches the maximum value. Therefore, in this case, the grayscale value displayed by the sub-pixel unit and the effective display area of the sub-pixel unit are both the maximum values.

Referring to FIG. 4, when the grayscale value displayed by the sub-pixel unit is the minimum grayscale value that the sub-pixel unit may display, a projection of the light shielding plate 231 of the MEMS light valve unit 23 and a projection of the light absorbing layer 211 in a direction perpendicular to the display panel are overlapped with each other. Therefore, at this time, the area of the light transmitting region in the sub-pixel unit is a value obtained by subtracting the area of the light absorbing layer 211 and the area of the light shielding plate 231 from the area of the color film 221, and the area of the light transmitting region has the minimum value (in FIG. 4, for example, the area of the light transmitting region is zero). Further, when the grayscale value of the sub-pixel unit is the minimum grayscale value that the sub-pixel unit may display, the propagation of the light rays (the light rays are represented by dotted lines with arrows in the figure) in the display panel is as follows. In the first aspect, in the region where the light shielding plate 231 is located, the light ray entering the display panel through the second substrate 22 passes through the second substrate 22 and the color film 221 and reaches the light shielding plate 231. Since the light shielding plate 231 is provided with the light reflecting layer 232 on the surface thereof facing the color film 221, the light ray is reflected and exits the display panel through the color film 221 and the second substrate 22 successively. In the second aspect, in the region where the light shielding plate 231 is located, the light ray entering the display panel through the first substrate 21 is blocked by the light shielding plate 231 and cannot exit the display panel through the second substrate 22. In the third aspect, in the region where the light absorbing layer 211 is located, the light ray entering the display panel through the second substrate 22 passes through the second substrate 22 and the color film 221, reaches the light absorbing layer 211 and is absorbed by the light absorbing layer 211. As may be seen from FIG. 4, when the grayscale value of the sub-pixel unit is the minimum grayscale value that the sub-pixel unit may display, the light ray exiting the display panel through the second substrate 22 only includes the light ray entering the display panel through the second substrate 22 in the region where the light shielding plate 231 is located. In this case, the grayscale value displayed by the sub-pixel unit is the minimum grayscale value that the sub-pixel unit may display.

Referring to FIG. 5, when the grayscale value displayed by the sub-pixel unit in the display panel is a grayscale value between the maximum grayscale value and the minimum grayscale value that the sub-pixel unit may display, a projection of the light shielding plate 231 of the MEMS light valve unit 23 and a projection of the light absorbing layer 211 in a direction perpendicular to the display panel are overlapped with each other partially. Therefore, at this time, the area of the light transmitting region in the sub-pixel unit is a value obtained by subtracting the area of the projection of the light shielding plate 231 and the light absorbing layer 211 in the direction perpendicular to the display panel from the area of the color film 221, and the area of the light transmitting region is between the maximum value and the minimum value. Further, when the grayscale value of the sub-pixel unit is a grayscale value between the maximum grayscale value and the minimum grayscale value that the sub-pixel unit may display, the propagation of the light rays (the light rays are represented by dotted lines with arrows in the figure) in the display panel is as follows. In the first aspect, in the light transmitting region, the light ray entering the display panel through the first substrate 21 passes through the first substrate 21, the color film 221 and the second substrate 22 successively, and then exits the display panel. In the second aspect, in the region where the light shielding plate 231 and/or the light absorbing layer 211 is located, the light ray entering the display panel through the first substrate 21 is blocked by the light shielding plate 231 and cannot exit the display panel through the second substrate 22. In the third aspect, in the region where the light absorbing layer 211 is located, the light ray entering the display panel through the second substrate 22 passes through the second substrate 22 and the color film 221, reaches the light absorbing layer 211 and is absorbed by the light absorbing layer 211. In the fourth aspect, in the region where the light shielding plate 231 is located, the light ray entering the display panel through the second substrate 22 passes through the second substrate 22 and the color film 221 and reaches the light shielding plate 231. Since the light shielding plate 231 is provided with the light reflecting layer 232 on the surface thereof facing the color film 221, the light ray is reflected and exits the display panel through the color film 221 and the second substrate 22 successively. As may be seen from FIG. 5, when the grayscale value displayed by the sub-pixel unit is a grayscale value between the maximum grayscale value and the minimum grayscale value that the sub-pixel unit may display, the light ray exiting the display panel through the second substrate 22 is the sum of the light ray entering the display panel through the first substrate 21 in the light transmitting region and the light ray entering the display panel through the second substrate 22 in the region where the light shielding plate 231 is located, and the area of the light transmitting region is a value between the maximum value and the minimum value. Therefore, the size of the area of the light transmitting region of the sub-pixel unit may be adjusted by adjusting the light shielding plate 231 to adjust the overlapping area of the light shielding plate 231 and the light absorbing layer 211, thereby realizing adjustment of the grayscale value.

A display panel according to the embodiment of the present disclosure includes a first substrate, a second substrate, a light absorbing layer disposed on a surface of the first substrate facing the second substrate, a color film disposed on a surface of the second substrate facing the first substrate, and a plurality of MEMS light valve units disposed between the light absorption layer and the color film. Since the plurality of MEMS light valve units are respectively located in the plurality of sub-pixel regions of the display panel and the area of the light absorption layer is smaller than the area of the color film in any sub-pixel region, a region other than the region where the light absorption layer and/or the light shielding plate are disposed in any sub-pixel region is a light transmitting region of the sub-pixel unit. In addition, since the light shielding plate of the MEMS light valve unit is provided with a light reflecting layer on the surface thereof facing the color film, the light shielding plate of the MEMS light valve unit may also project the reflected light onto the color film. That is, an effective display area of a sub-pixel in the MEMS display device according to the embodiment of the present disclosure is sum of the area of the light shielding plate and the area of the light transmitting region. Therefore, compared with the MEMS display device in FIG. 1, the display panel according to the embodiment of the present disclosure may increase the ratio of the area of the sub-pixel to the effective display area thereof. That is, the embodiment of the present disclosure may increase an aperture ratio of the MEMS display device.

It should also be noted that since the light shielding plate of the MEMS light valve unit is provided with the light reflecting layer on the surface thereof facing the color film, compared with the display panel in FIG. 1, the display panel according to the embodiment of the present disclosure requires less backlight brightness to display a grayscale value of the same brightness, thus requires lower voltage to drive a backlight assembly. Therefore, the embodiments of the present disclosure may also reduce the power consumption of the display panel.

On the other hand, since the light shielding plate of the MEMS light valve unit is provided with the light reflecting layer on the surface thereof facing the color film, compared with the display panel in FIG. 1, the display panel according to the embodiment of the present disclosure may display higher brightness. Therefore, the embodiment of the present disclosure further increases outdoor readability of the display panel.

Figure 6:
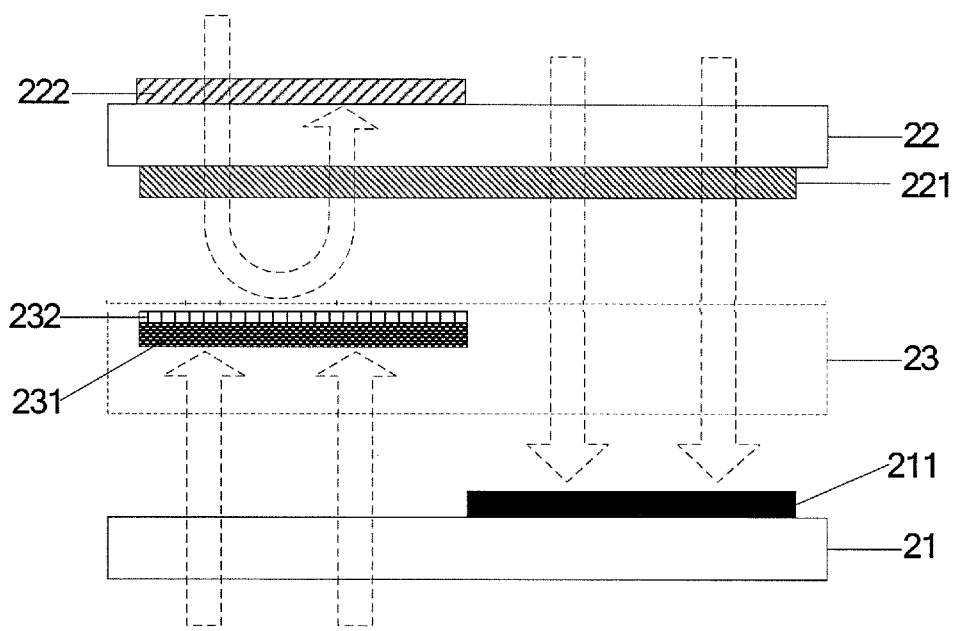
FIG. 6 is a second schematic structural diagram of a display panel according to an embodiment of the present disclosure.

Further, the contrast of the display device refers to the difference between the maximum brightness and the minimum brightness. The contrast has a very important effect on the visual effect. Generally speaking, the larger the contrast is, the clearer the image is and the more vivid the color is. Therefore, a high contrast is useful for the clarity, detail presenting, grayscale performance. As may be seen from FIG. 4, when the grayscale value of the sub-pixel unit is the minimum grayscale value that the sub-pixel unit may display, the display brightness of the sub-pixel is the brightness of the light ray entering the display panel through the second substrate 22 in the region where the light shielding plate 231 is located. Therefore, the minimum grayscale value that the display panel may display is not zero, which in turn affects the contrast of the display panel and thus affects the display effect of the display panel. Based on the above problem, an embodiment of the present disclosure further provides a display panel. Referring to FIG. 6, on the basis of the display panel as shown in FIG. 2, the display panel according to the embodiment of the present disclosure further includes: a polarizer 222 disposed on the second substrate 22.

A ¼ phase retardation film (not shown in the figure) is disposed on the polarizer 222. The projection of the polarizer 222 and the projection of the light absorbing layer 211 in a direction perpendicular to the display panel are not overlapped with each other.

It should be noted that, in the above embodiment, the projections being not overlapped with each other means that the intersection is zero. That is, the projection of the polarizer 222 in the direction perpendicular to the display panel and the projection of the light absorbing layer 211 in the direction perpendicular to the display panel have no intersection.

Since the polarizer 222 is disposed on the second substrate 22 in the above embodiment, when the grayscale value of the sub-pixel unit is the minimum grayscale value that the sub-pixel unit may display, the light ray reflected by the light reflecting layer 232 on the light shielding plate 231 shall exit the display panel through the ¼ phase retardation film on the polarizer 222. The ¼ phase retardation film may make the phase of the reflected light be opposite to that of the incident light, so that the incident light and the reflected light may cancel out each other to achieve the purpose of eliminating the light ray. Therefore, the above embodiment may further reduce the minimum grayscale value that the sub-pixel unit may display, improve the contrast of the display panel, and thus improve the display effect of the display panel.

In an embodiment, the area of the color film 221 is smaller than or equal to the sum of the area of the light absorbing layer 211 and the area of the polarizer 222 in any sub-pixel region.

In FIG. 6. as an example, the area of the color film 221 is equal to the sum of the area of the light absorbing layer 211 and the area of the polarizer 222. However, in practical application, those skilled in the art may also conceive that the sum of the area of the light absorbing layer 211 and the area of the polarizer 222 is larger than the area of the color film 221.

By making the area of the color film 221 smaller than or equal to the sum of the area of the light absorbing layer 211 and the area of the polarizer 222 in any sub-pixel region, when the grayscale value displayed by the sub-pixel unit is the minimum gray that the sub-pixel unit may display, all the light rays reflected by the light reflecting layer 232 shall pass through the ¼ phase retardation film on the polarizer 222 to exit the display panel. Therefore, the embodiment of the present disclosure may reduce the minimum grayscale value that the sub-pixel unit may display, and improve the contrast of the display panel, thereby improving the display effect of the panel display.

Figure 7:
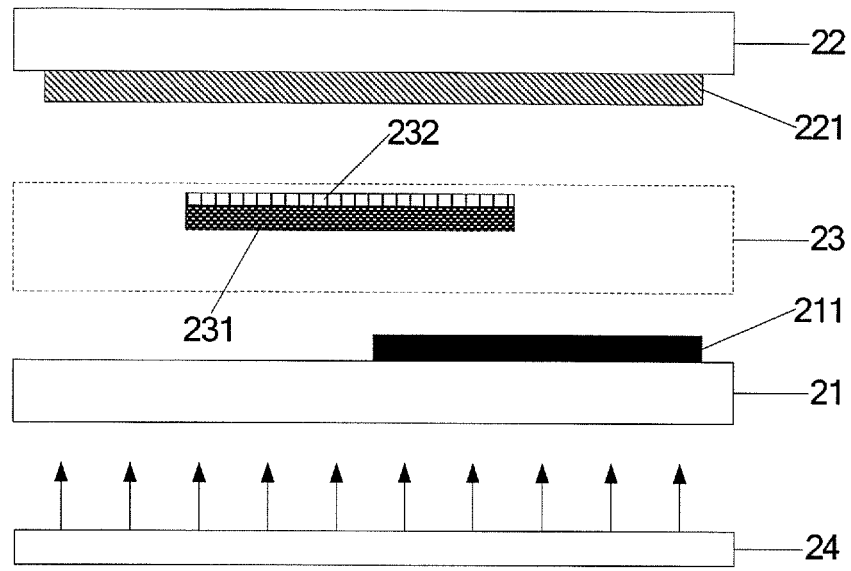
FIG. 7 is a third schematic structural diagram of a display panel according to an embodiment of the present disclosure.

Further, referring to FIG. 7, on the basis of the display panel as shown in FIG. 2, the display panel according to the embodiment of the present disclosure further includes a backlight assembly 24.

For example, as shown in FIG. 7, the backlight assembly 24 may be disposed on the back surface of the first substrate 21.

The backlight assembly 24 provides a backlight to the display panel.

Figure 8:
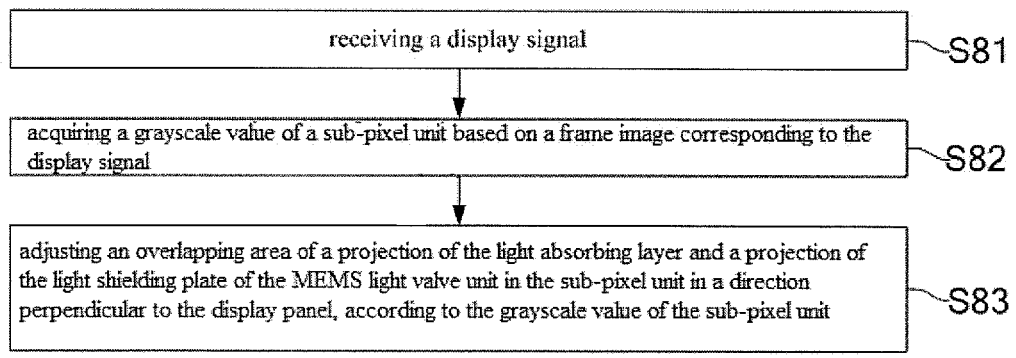
FIG. 8 is a flowchart of a driving method of a display panel according to an embodiment of the present disclosure.

Another embodiment of the present disclosure provides a driving method of a display panel. The driving method of the display panel is for driving the display panel provided in any one of the above embodiments. Specifically, as shown in FIG. 8, the driving method of the display panel includes the following steps.

In step S81, a display signal is received.

In step S82, a grayscale value of a sub-pixel unit is acquired based on a frame image corresponding to the display signal.

In step S83, an overlapping area of a projection of the light absorbing layer and a projection of the light shielding plate of the MEMS light valve unit in the sub-pixel unit in a direction perpendicular to the display panel is adjusted according to the grayscale value of the sub-pixel unit.

In the above step S83, the grayscale value of the sub-pixel unit has a positive correlation with the overlapping area of the projection of the light absorbing layer and the projection of the light shielding plate of the MEMS light valve unit in the direction perpendicular to the display panel.

In an embodiment, the step S83 includes: adjusting the light shielding plate of the MEMS light valve unit in the sub-pixel unit such that the projection of the light shielding plate and the projection of the light absorbing layer in the direction perpendicular to the display panel are overlapped with each other entirely, when the grayscale value of the sub-pixel unit is a maximum grayscale value that the sub-pixel unit may display.

In an embodiment, the above step S83 includes: adjusting the light shielding plate of the MEMS light valve unit in the sub-pixel unit such that the projection of the light shielding plate and the projection of the light absorbing layer in the direction perpendicular to the display panel are not overlapped with each other, when the grayscale value of the sub-pixel units is a minimum grayscale value that the sub-pixel unit may display.

It should be noted that the projections being overlapped with each other entirely means that the projection of the light shielding plate may be covered by the projection of the light absorbing layer in the direction perpendicular to the display panel, or the projection of the light absorbing layer may be covered by the projection of the light shielding plate in the direction perpendicular to the display panel, or the projection of the light absorbing layer and the projection of the light shielding plate in the direction perpendicular to the display panel may cover each other. Specifically, when the area of the light shielding plate is larger than the area of the light absorbing layer, the projection of the light absorbing layer in the direction perpendicular to the display panel may be covered by the projection of the light shielding plate in the direction perpendicular to the display panel. When the area of the light shielding plate is smaller than the area of the light absorbing layer, the projection of the light shielding plate in the direction perpendicular to the display panel may be covered by the projection of the light absorbing layer in the direction perpendicular to the display panel. When the area of the light shielding plate is equal to the area of the light absorbing layer, the projection of the light shielding plate and the projection of the light absorbing layer in the direction perpendicular to the display panel may cover each other. As discussed above, in the embodiments of the present disclosure, the projections being not overlapped with each other means that the projection of the light absorbing layer in the direction perpendicular to the display panel and the projection of the light shielding plate in the direction perpendicular to the display panel have no intersection.

A further embodiment of the present disclosure provides a display device including the display panel according to any one of the above embodiments and capable of being driven by the driving method of a display panel according to any one of the above embodiments.

As an example, the display device may be: an electronic paper, a cell phone, a tablet, a television, a display, a notebook computer, a digital photo frame, a navigator product or a component thereof.

The foregoing descriptions are merely specific embodiments of the present disclosure, and the protection scope of the present disclosure is not limited thereto. Modifications or substitutions that may be easily conceived by those skilled in the art within the technical scope disclosed in the present disclosure, should be covered by the protection scope of the present disclosure Therefore, the protection scope of the present disclosure should be subject to the protection scope of the claims.

What is claimed is:

1. A display panel, comprising:
   a first substrate;
   a second substrate;
   a light absorbing layer, disposed on a surface of the first substrate facing the second substrate;
   a color film, disposed on a surface of the second substrate facing the first substrate;
   a plurality of MEMS light valve units, disposed between the light absorbing layer and the color film; and
   a backlight assembly, disposed at a back surface of the first substrate, and configured to emit light to the back surface of the first substrate for providing a backlight to the display panel, the back surface of the first substrate being a side surface away from the second substrate, and the first substrate being closer to the backlight assembly than the second substrate,
   wherein the MEMS light valve unit comprises a light shielding plate and a light reflecting layer disposed on a surface of the light shielding plate facing the color film,
   wherein the plurality of MEMS light valve units is respectively located in a plurality of sub-pixel regions of the display panel, and an area of the light absorbing layer is smaller than an area of the color film in any one of the sub-pixel regions,
   wherein the light shielding plate and the light reflecting layer of the MEMS light value unit are configured to be moveable between the first substrates and the second substrates in a direction substantially parallel to the first substrate and the second substrates.

2. The display panel according to claim 1 further comprising: a polarizer disposed on the second substrate,
   wherein a 1/4 phase retardation film is disposed on the polarizer, and a projection of the polarizer and a projection of the absorption layer in a direction perpendicular to the display panel are not overlapped with each other.

3. The display panel according to claim 2, wherein an area of the color film is smaller than or equal to a sum of an area of the light absorbing layer and an area of the polarizer in any one of the sub-pixel regions.

4. The display panel according to claim 1, wherein the light shielding plate is formed of a metal material.

5. The display panel according to claim 1, wherein the light absorption layer is formed of a black matrix material.

6. A driving method of a display panel, for driving the display panel according to claim 1, wherein the method comprising:
   receiving a display signal;
   acquiring a grayscale value of a sub-pixel unit based on a frame image corresponding to the display signal; and
   adjusting an overlapping area of a projection of the light absorbing layer and a projection of the light shielding plate of the MEMS light valve unit in the sub-pixel unit in a direction perpendicular to the display panel, according to the grayscale value of the sub-pixel unit,
   wherein the grayscale value of the sub-pixel unit has a positive correlation with the overlapping area of the projection of the light absorbing layer and the projection of the light shielding plate of the MEMS light valve unit in the direction perpendicular to the display panel.

7. The method according to claim 6, wherein the step of adjusting an overlapping area of a projection of the light absorbing layer and a projection of the light shielding plate of the MEMS light valve unit in the sub-pixel unit in a direction perpendicular to the display panel, according to the grayscale value of the sub-pixel unit comprises:
   adjusting the light shielding plate of the MEMS light valve unit in the sub-pixel unit such that the projection of the light shielding plate and the projection of the light absorbing layer in the direction perpendicular to the display panel are overlapped with each other entirely, when the grayscale value of the sub-pixel unit is a maximum grayscale value that the sub-pixel unit is capable of displaying.

8. The method according to claim 6, wherein the step of adjusting an overlapping area of a projection of the light absorbing layer and a projection of the light shielding plate of the MEMS light valve unit in the sub-pixel unit in a direction perpendicular to the display panel, according to the grayscale value of the sub-pixel unit comprises:
   adjusting the light shielding plate of the MEMS light valve unit in the sub-pixel unit such that the projection of the light shielding plate and the projection of the light absorbing layer in the direction perpendicular to the display panel are not overlapped with each other, when the grayscale value of the sub-pixel units is a minimum grayscale value that the sub-pixel unit is capable of displaying.

9. A display device, comprising: the display panel according to claim 1.

10. The display device according to claim 9, wherein the display panel further comprises a polarizer disposed on the second substrate, and a 1/4 phase retardation film is disposed on the polarizer, and a projection of the polarizer and a projection of the absorption layer in a direction perpendicular to the display panel are not overlap with each other.

11. The display device according to claim 10, wherein an area of the color film is smaller than or equal to a sum of an area of the light absorbing layer and an area of the polarizer in any one of the sub-pixel regions.

12. The display device according to claim 9, wherein the light shielding plate is formed of a metal material.

13. The display device according to claim 9, wherein the light absorption layer is formed of a black matrix material.

* * * * *